(12) United States Patent
Lu

(10) Patent No.: US 6,378,830 B1
(45) Date of Patent: Apr. 30, 2002

(54) ADJUSTABLE SUPPORT FOR AN LCD MONITOR

(76) Inventor: Sheng-Nan Lu, No. 174, Chunying St., Shulin Chen, Taipei Hsien (TW)

( * ) Notice: Subject to any disclaimer, the term of this patent is extended or adjusted under 35 U.S.C. 154(b) by 37 days.

(21) Appl. No.: 09/684,364

(22) Filed: Oct. 5, 2000

(51) Int. Cl.$^7$ ................................................. E04G 3/00
(52) U.S. Cl. ................... 248/278.1; 16/337; 248/183.1; 248/418; 361/681
(58) Field of Search .............................. 248/278.1, 131, 248/276.1, 274.1, 284.1, 279.1, 917, 922, 918, 923, 291.1, 371, 397, 398, 418, 415, 919, 921, 183.1, 183.2; 361/681, 682; 16/337, 342

(56) References Cited

U.S. PATENT DOCUMENTS

| | | | | |
|---|---|---|---|---|
| 4,034,946 A | * | 7/1977 | Zimmer, Jr. ................. | 248/183 |
| 4,850,804 A | * | 7/1989 | Huang ...................... | 248/278.1 |
| 5,318,257 A | * | 6/1994 | Tani .......................... | 248/125 |
| 5,335,142 A | * | 8/1994 | Anderson .................. | 361/681 |
| 5,425,460 A | * | 6/1995 | Barbarian .................. | 211/77 |
| 5,812,368 A | * | 9/1998 | Chen et al. ................ | 361/681 |
| 6,018,847 A | * | 2/2000 | Lu ............................. | 16/337 |
| 6,015,919 A | * | 8/2000 | Min ........................... | 248/418 |
| 6,145,797 A | * | 11/2000 | Uehara ..................... | 248/291.1 |
| 6,163,928 A | * | 12/2000 | Chung ........................ | 16/342 |
| 6,244,553 B1 | * | 6/2001 | Wang ....................... | 248/278.1 |
| 6,315,259 B1 | * | 11/2001 | Kolb ......................... | 248/276.1 |

* cited by examiner

Primary Examiner—Ramon O Ramirez
Assistant Examiner—Tan Le
(74) Attorney, Agent, or Firm—Heller Ehrman White & McAuliffe LLP

(57) ABSTRACT

An adjustable support for an LCD monitor has a base plate. An inverted U-shape base seat is mounted on the base plate and has a first aperture defined through an upper wall thereof and a first stop formed on the upper wall. A vertical axle is pivotally mounted on the base seat. The axle has a threaded part extending through the first aperture and a spacing collar on the first aperture, and is engaged with a first nut beneath the upper wall of the base seat. The spacing collar has a notch defined at an outer periphery thereof and the first stop is located within the notch. Two ears are oppositely formed at an upper seat on a top end of the axle, wherein each of the ears has a cutout defined at a front end thereof. A monitor bracket has two fingers respectively pivotally mounted on the ears and each with a second stop formed thereon and limited by the cutout when the bracket is turned relative to the ears.

9 Claims, 4 Drawing Sheets

ADJUSTABLE SUPPORT FOR AN LCD MONITOR

BACKGROUND OF THE INVENTION

1. Field of the Invention

The present invention is related to an adjustable support for an LCD monitor, and more particularly to a support which can be turned about both a horizontal axis and a vertical axis.

2. Description of Related Art

LCD monitors as computer peripheral equipment are welcome because of being light-weight and having excellent display quality. A conventional support for the LCD monitor only can be adjusted about a horizontal axis and so the LCD monitor only can be turned up or down. When required to be turned left or right, the LCD monitor and the support must be lifted up and turned, which is clearly very inconvenient for a user.

Therefore, the invention provides an adjustable support for an LCD monitor to mitigate and/or obviate the aforementioned problems.

SUMMARY OF THE INVENTION

The main objective of the present invention is to provide a support for an LCD monitor which can be turned about both a horizontal axis or a vertical axis.

Another objective of the present invention is to provide a support for an LCD monitor which can be securely positioned in a desired direction when adjustment turning has stopped.

Other objects, advantages and novel features of the invention will become more apparent from the following detailed description when taken in conjunction with the accompanying drawings.

DETAILED DESCRIPTION OF THE PREFERRED EMBODIMENT

Figure 1:
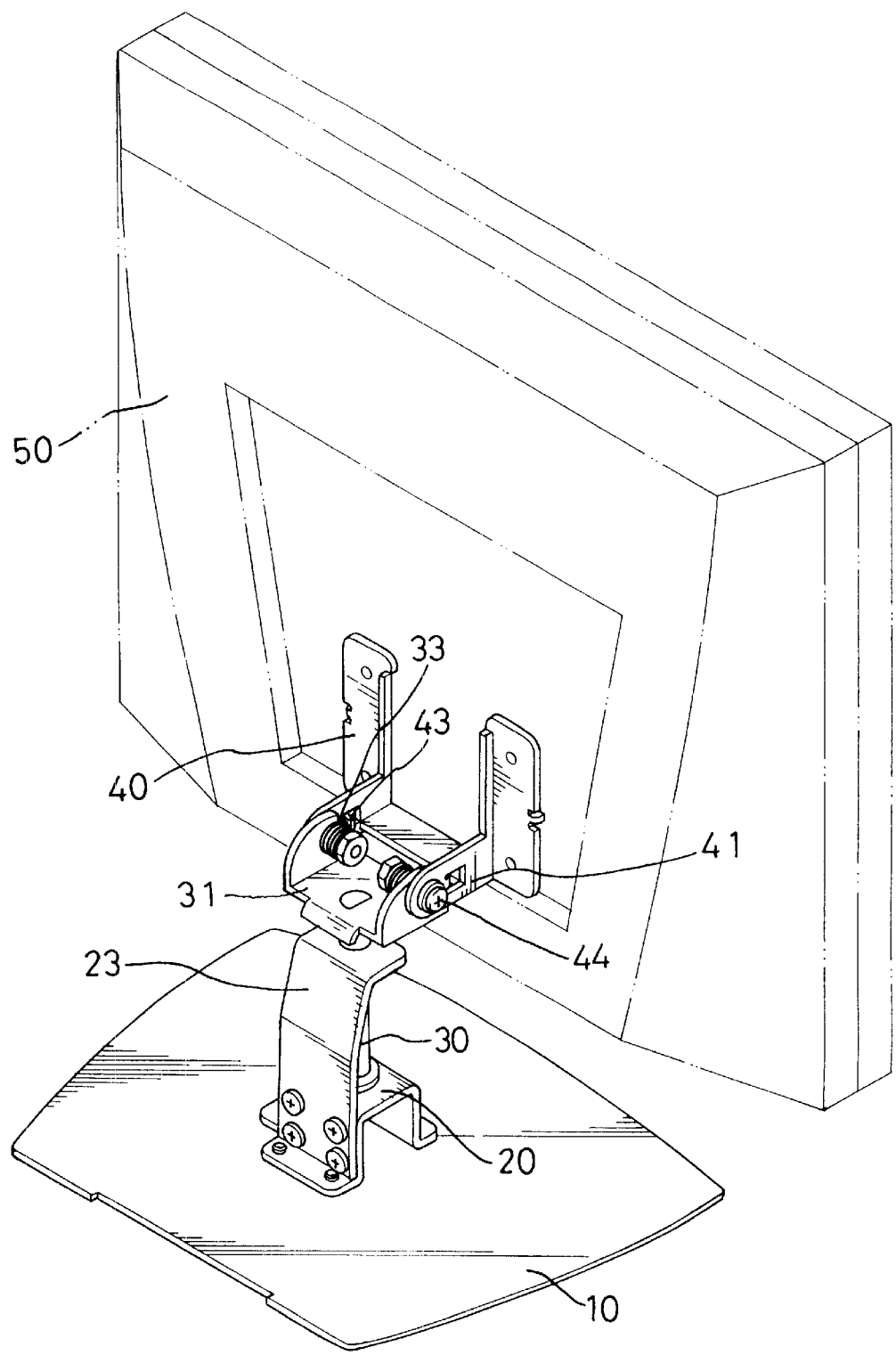
FIG. 1 is a perspective view of an adjustable support in accordance with the invention mounted on an LCD monitor.
Figure 2:
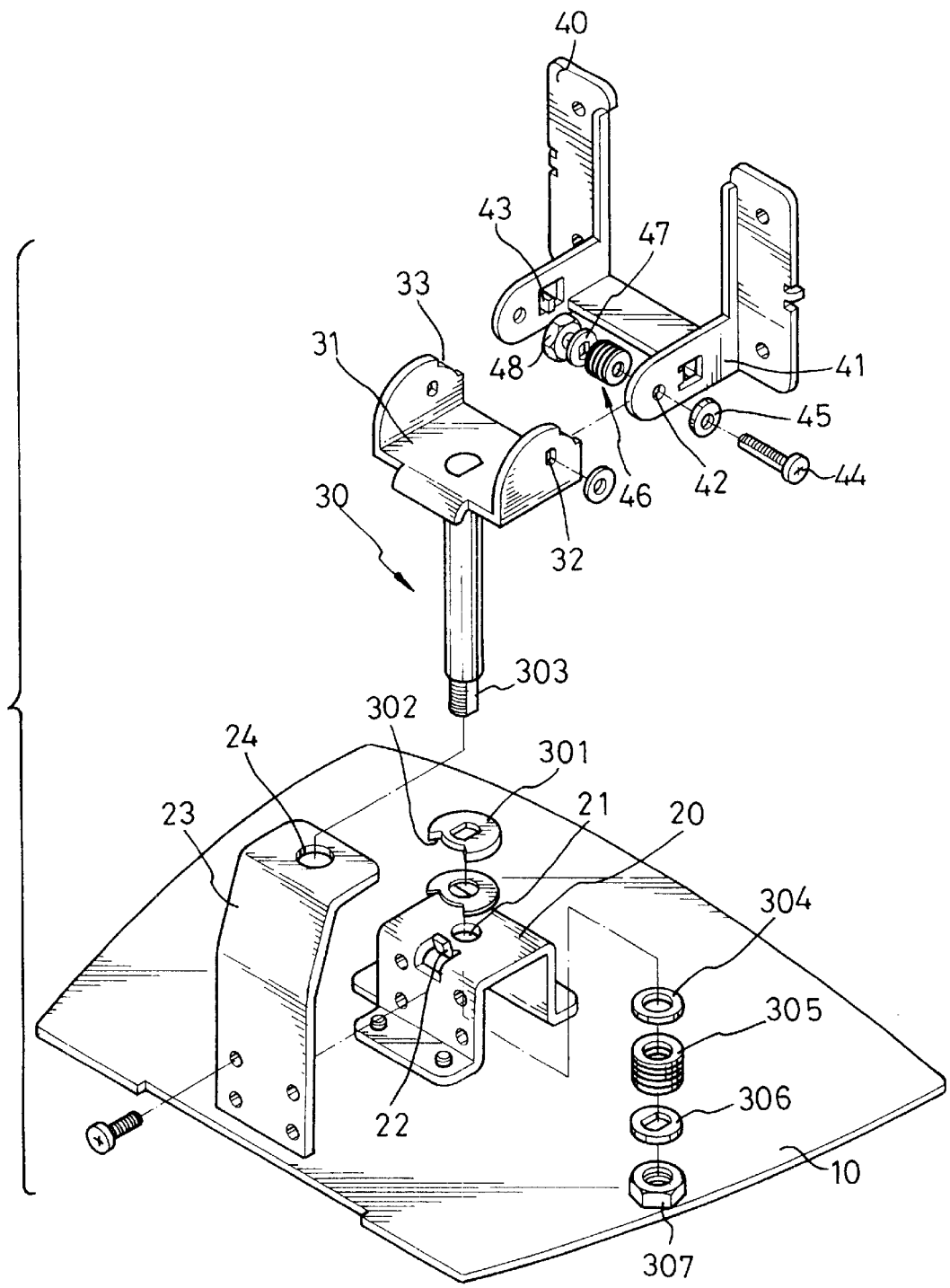
FIG. 2 is an exploded perspective view of the adjustable support in accordance with the invention.

Referring to FIGS. 1 and 2, a support in accordance with the present invention comprises a base plate (10), a base seat (20), a vertical axis assembly (30), and a monitor bracket (40) for an LCD monitor (50) to be mounted thereon.

The base support (20) mounted on the base plate (10) is formed as an inverted U-shape with two side walls and an upper wall. A first aperture (21) is defined through the upper wall of the bracket (20). A first stop (22) is formed on the upper wall and beside the first aperture (21).

An inverted L-shape arm (23) is formed with an upright plate and a lateral plate. The upright plate of the arm (23) is mounted on a side wall of the bracket (20), and a second aperture (24) defined through the lateral plate is in alignment with the first aperture (21).

The vertical axis assembly (30) is composed of an axle and an upper seat (31) formed on an upper end of the axle. Two ears (not numbered) are oppositely formed on the upper seat (31), and two first holes (32) are respectively defined through the ears (31). The ears each have a cutout (33) defined at a front end thereof. The axle extends through the second aperture (24) and has a threaded part (303) formed at a lower end thereof and extending through the first aperture (21). The threaded part (303) has two first flats (not numbered) diametrically oppositely defined on an outer periphery thereof. A spacing collar (301) is provided on the upper wall of the base seat (20) and has an opening formed as a configuration corresponding to the cross section of the threaded part (303) for the threaded part (303) extending therethrough and a notch (3 02) defined at an outer periphery thereof. The first stop (22) is located within the notch (302) to limit a turning extent of the vertical axis assembly (30).

The threaded part (303) is engaged with a nut (307) under the upper wall. A first washer (304), a plurality of friction rings (305) and a second washer (306) are in turn provided between the upper wall and the nut (307) to increase the friction to the axle for securely positioning the axle at a desired direction when its adjustment turning is stopped. The second washer (306) also has an opening formed corresponding to the cross section of the threaded part (303).

The monitor bracket (40) has two fingers (41) extending rearwards and each has a second hole (42) defined therethrough. Two second stops (43) are respectively formed on the fingers (41). Two screws (44), each with two flats diametrical oppositely defined at an outer periphery thereof, are respectively inserted through the first and second holes (32, 42) to pivotally mount the monitor bracket (40) on the upper seat (31) of the vertical axis assembly (30). The first holes (32) are each formed as a configuration corresponding to a cross-section of the screws (44). The cutouts (33) match the second stops (43) to limit the turning extent of the monitor bracket (40).

Two third washers (45) are respectively provided between the screws (44) and the fingers (41). The screws (44) are respectively engaged with second nuts (48) between the fingers (41). A fourth washer (47), and a plurality of second friction rings (46) are in turn provided between each of the nuts (48) and the fingers (41) to increase the friction to the respective screw (44) for securely positioning the support at a desired direction when adjustment turning is stopped. The fourth washers (47) each have an opening formed as a configuration corresponding to the cross section of the screws (44).

Figure 3:
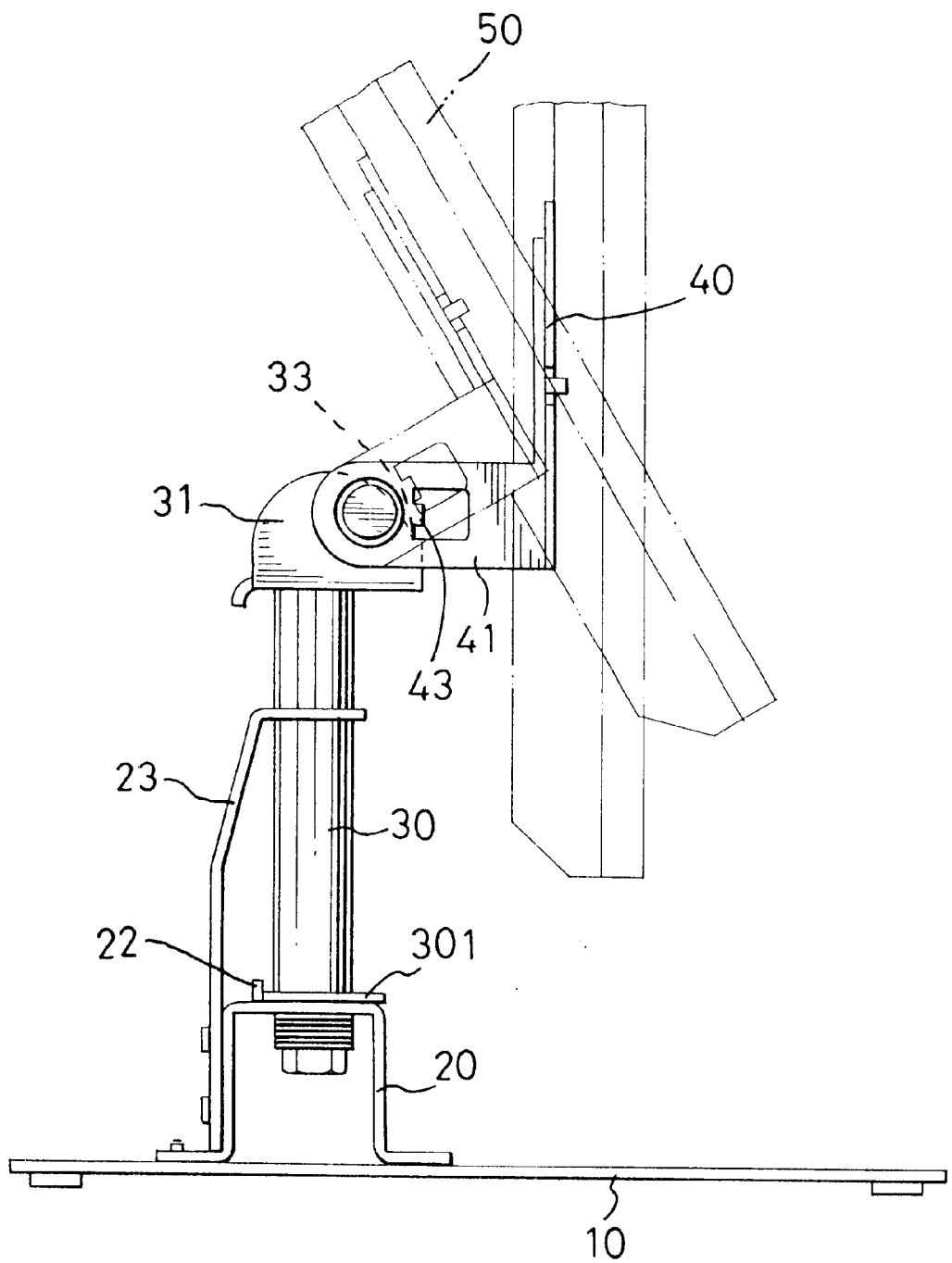
FIG. 3 is side view of the support being turned about a horizontal axis.
Figure 4:
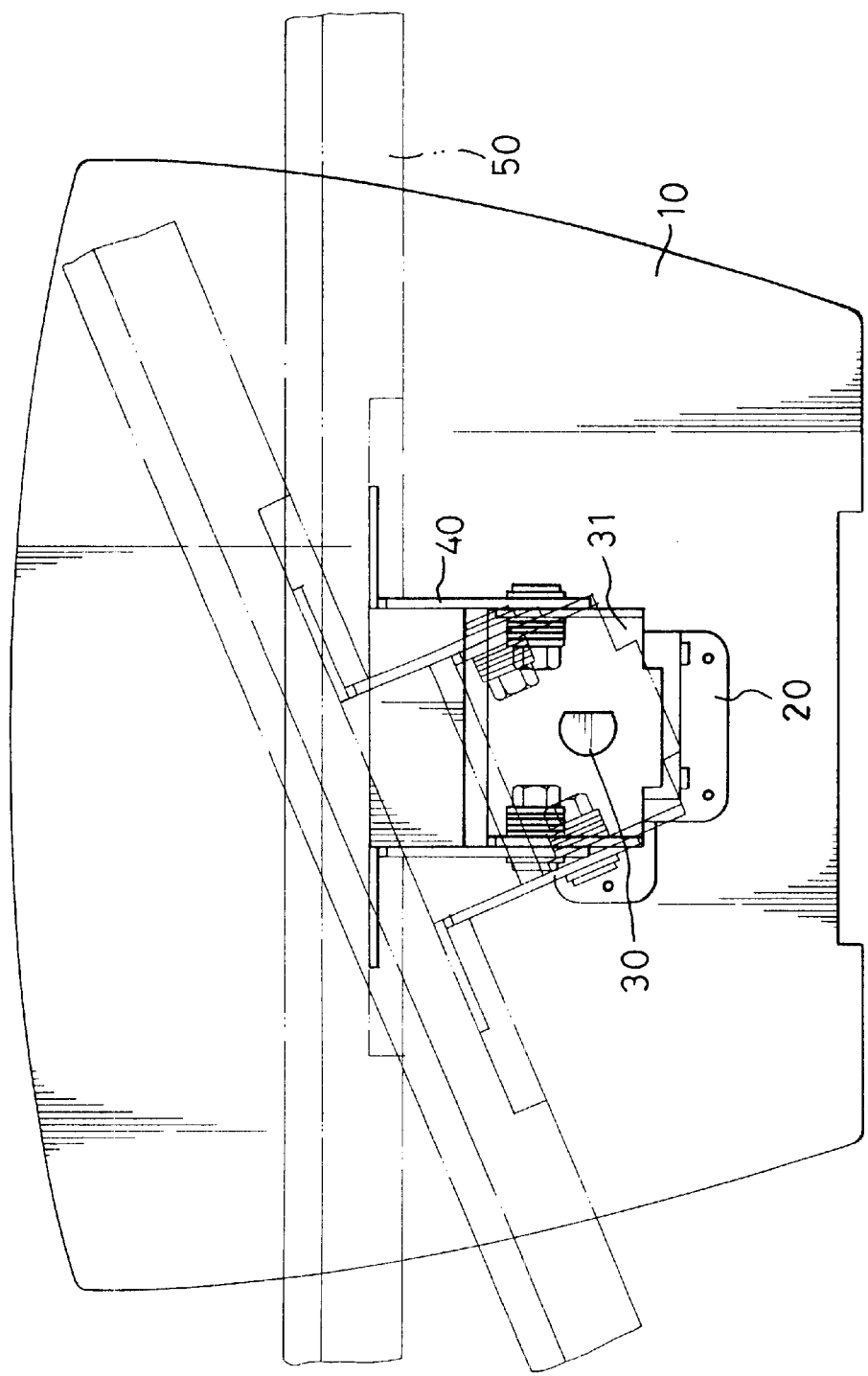
FIG. 4 is a top view of the support being turned about a vertical axis.

According to the present invention, the LCD monitor (50) can be adjusted up or down by turning the monitor bracket (40), as shown in FIG. 3; and can be adjusted left or right by turning the vertical axis assembly (30), as shown in FIG. 4.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An adjustable support for an LCD monitor, the support comprising:

a base plate (10);

an inverted U-shape base seat (20) formed with two opposite side walls and an upper wall and mounted on the base plate (10), the base seat (20) having a first aperture (21) defined through the upper wall thereof and a first stop (22) formed on the upper wall;

a vertical axis assembly (30) pivotally mounted on the base seat (20), the vertical axis assembly (30) including an axle having a threaded part (303) extending through the first aperture (21) and a spacing collar (301) on the first aperture (21) and engaged with a first nut (307) beneath the upper wall of the base seat (20), wherein the spacing collar (301) has a notch (302) defined at an outer periphery thereof and the first stop (22) is located within the notch (302), and having two ears oppositely formed at an upper seat (31) on a top end of the axle, wherein each of the ears has a cutout (33) defined at a front end thereof; and a monitor bracket (40) having two fingers (41) respectively and pivotally mounted on the ears (31) and each with a second stop (43) formed thereon and limited by the cutout (33) when the bracket (40) is turned relative to the ears (31).

2. The adjustable support for an LCD monitor as claimed in claim 1, further has an L-shaped arm (23) formed with an upright plate and a lateral plate, wherein the upright plate is mounted on a side wall of the base seat (20) and the lateral plate has a second aperture (24) defined therethrough and in alignment with the first aperture (21) for the vertical axle to extend therethrough.

3. The adjustable support for an LCD monitor as claimed in claim 1, wherein the threaded part (303) has two flats diametrically oppositely formed at an outer periphery thereof and the spacing collar (301) has an opening corresponding to the cross section of the threaded part (303).

4. The adjustable support for an LCD monitor as claimed in claim 1, wherein a first washer (304), a plurality of friction rings (305) and a second washer (306) are in turn provided between the upper wall of the base seat (20) and the first nut (307).

5. The adjustable support for an LCD monitor as claimed in claim 4, wherein the second washer (306) has an opening corresponding to the cross section of the threaded part (303).

6. The adjustable support for an LCD monitor as claimed in claim 1, wherein the ears (31) each have a first hole (32) defined therethrough, the fingers (42) each have a second hole (42) defined therethrough, and two screws (44) respectively extend through the first holes (32) and the second holes (42) and are engaged with two second nuts (48).

7. The adjustable support for an LCD monitor as claimed in claim 6, wherein the screws (44) each have two flats defined at an outer periphery thereof and the first holes (32) are shaped as a configuration corresponding to the cross section of the screws (44).

8. The adjustable support for an LCD monitor as claimed in claim 6, wherein a third washer (45) is provided between each of the screws (44) and the fingers (41), a plurality of second friction rings (46) and a fourth washer (47) are in turn provided between each of the fingers (41) and the second nuts (48).

9. The adjustable support for an LCD monitor as claimed in claim 8, wherein the fourth washers (47) each have an opening corresponding to the cross section of the screws (44).

\* \* \* \* \*